July 2, 1968     R. HAMILTON     3,390,479
CASTING GUN
Filed June 20, 1966
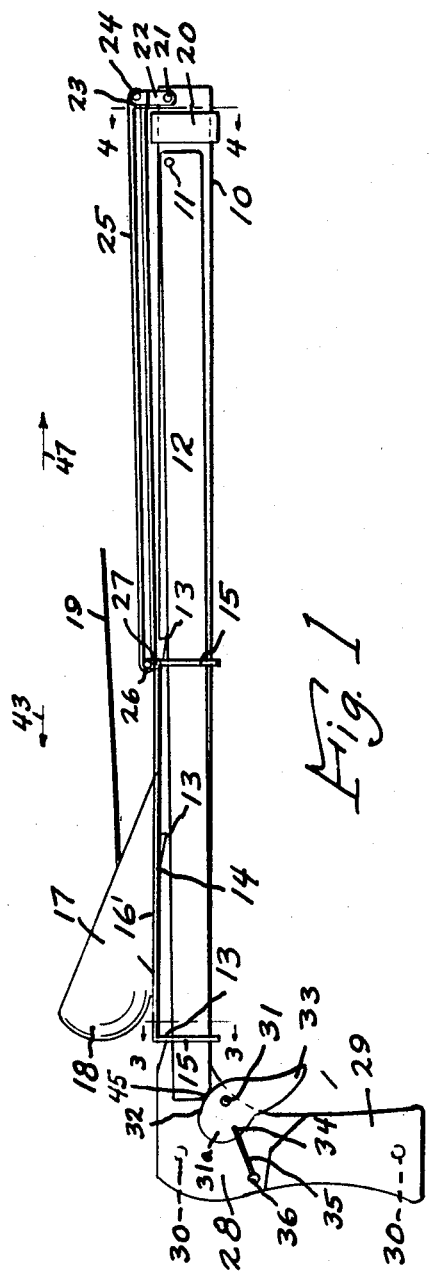
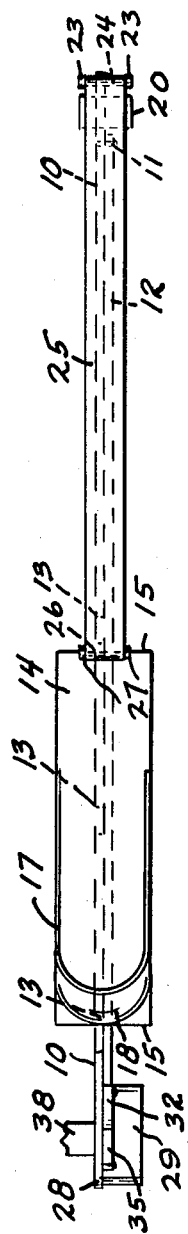
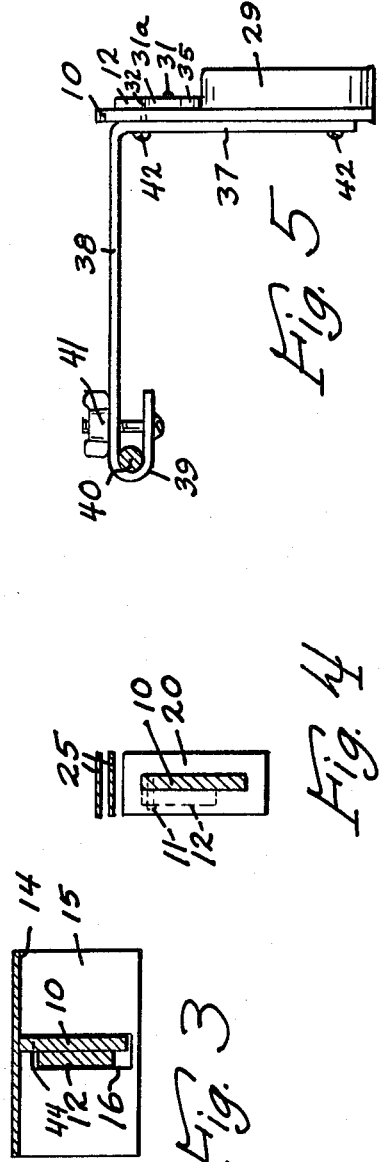
INVENTOR.
*Ray Hamilton*
BY
*Sam J. Slotsky*
ATTORNEY

United States Patent Office 3,390,479
Patented July 2, 1968

3,390,479
CASTING GUN
Ray Hamilton, Washta, Iowa 51061
Filed June 20, 1966, Ser. No. 558,938
3 Claims. (Cl. 43—19)

My invention relates to a casting gun.

An object of my invention is to provide a casting gun which can be either attached to a fishing rod, or used separately, for casting a sinker, line and fishing hook to various distances.

A further object of my invention is to provide a casting gun of relatively simple construction which is easily loaded and operated.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the gun,

FIGURE 2 is a plan view of FIGURE 1,

FIGURE 3 is an enlarged sectional view taken along the line 3—3 of FIGURE 1,

FIGURE 4 is an enlarged sectional view taken along the line 4—4 of FIGURE 1, and FIGURE 5 is a rear view showing the device as attached to a fishing rod.

My invention contemplates the provision of a casting gun arrangement wherein a fisherman can cast a sinker, line etc. to desired distances and which casting gun can easily be attached to a rod and reel, or can be used separately. My device is especially useful for women who cannot easily cast in the usual manner. Also, the device can be effectively used beneath trees, or in other locations where the conventional casting method cannot be employed.

In describing my invention, I have used the character 10 to designate a lengthened strap or bar of metal and pivoted at 11 thereto is a further lengthened trigger bar strap 12. The strap 10 includes a series of spaced notches 13 having the square shoulders as shown, and resting upon the top of the strap 10 is a carriage member 14 having the vertically positioned downwardly bent flanges 15, which flanges include the slots 16 therein and which slots receive both members 10 and 12.

Securely attached to the member 14 at 16′ is a receptacle-like device 17 having the curved rear portion 18 and which device 17 is adapted to receive the sinker, line and hook, etc., the character 19 indicating the line. Attached to the forward end of the strap 10 is a rubber shock absorbing member 20 which snugly receives the member 10, and also attached to the member 10 as at 21 is the clevis device 22 having the arms 23 through which is received a pin 24 which can be removed and replaced to thereby be secured between the ends of the continuous rubber bands 25, the other end of the band 25 being received over a further pin 26 which is received within small posts 27, attached to the member 14.

The strap 10 is suitably welded or otherwise secured to a handle portion 28 to which is attached the further thickened handle portion 29 which includes the tapped openings 30.

Pivotally attached at 31 to the handle portion 28 is the cam structure 31a having the portion 32 which is positioned eccentrically with respect to the pivoting point 31, the cam member terminating in the trigger finger portion 33. The cam member includes a slot at 34 for the reception of a flat spring 35 which is attached at 36 to the handle portion 28.

As shown in FIGURE 5 the device can be suitably attached to a fishing rod by means of a bracket having the vertical portion 37 and the horizontal portion 38 extending integrally therefrom, the portion 38 continuing into the curled portion 39 which is tightly secured to the fishing rod 40 by means of a wing-nut and bolt arrangement 41. The bracket is firmly secured to the gun by means of the screws 42 passing through the bracket portion 37 and into the openings 30.

The device operates in the following manner.

The gun is preferably attached to the fishing rod as shown although it could be used separately by not using the bracket 37, 38 and the line could be pulled in by hand after being cast, however the preferable use is as shown, and first the fisherman pulls the member 17 rearwardly in the direction of the arrow 43, and to regulate the extent of the cast itself, the rear flange 15, for instance, is placed in any one of the notches 13, FIGURE 1 showing the longest cast possible, since the rubber band 25 is stretched to its limit at this point, and by merely allowing the top 44 (see FIGURE 3) of the slot 16 to fall within the notch 13, the device will be ready for the casting operation.

The hook, sinker, etc., are first placed in the member 17, and it will be noted that the end portion 45 of the bar 12 will rest upon the cam surface 32. To discharge the member 17 to hurl the sinker, hook, etc., the trigger 33 is pulled in the direction of the arrow 43 whereupon the eccentric surface 32 will raise the point 45 until the upper edge of the bar 12 will raise the slots 16 to the level of the upper edge of the member 10 which will then release the member 17 which will be ejected rapidly in the direction of the arrow 47, and the entire line, etc. will be cast out to the desired distance.

After the cast, the reel can be operated in the usual manner, the reel not being shown herein.

By virtue of this device, it will not be necessary for the fisherman to use extreme arm movements and the like, this device thereby rendering the casting operation relatively easy.

The various notches 13 permit the casting range to be regulated as desired and the rubber member 20 permits the shock of the carriage member to be absorbed.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A casting gun comprising a lengthened bar, a trigger bar pivotally attached to said lengthened bar at the forward end thereof, a casting carriage member supported along the upper edge of said lengthened bar, said casting carriage member including a receptacle for providing means for placing fishing elements therein which are to be cast, said carriage member having substantially vertically positioned flanges having slots therein for slidably receiving said lengthened bar and said trigger bar, the upper edge of said lengthened bar including notches for engaging the upper ends of said slots, a resilient member attached to the forward end of said lengthened bar and to said carriage member, means for moving the free rear end of said trigger bar upwardly to thereby release said carriage member from any of said notches.

2. The structure of claim 1 and wherein said means for moving said trigger bar upwardly comprises a spring-urged cam member, a handle to which said cam member is pivotally attached, said cam member having an eccentric portion adapted to abut against the said free rear end of said trigger bar, said cam member including a finger portion extending therefrom, whereby the pulling of said finger portion will actuate said spring-urged cam member to raise the said rear end of said trigger bar and to release said carriage member.

3. The structure of claim 2 and including a bracket attached to said handle, said bracket including a clamp element attached thereto, whereby said bracket can be secured to a fishing rod.

References Cited

UNITED STATES PATENTS

| | | | |
|---|---|---|---|
| 2,569,604 | 10/1951 | Hall | 43—19 |
| 2,645,218 | 7/1953 | Fisher | 43—19 X |
| 2,875,548 | 3/1959 | Stewart | 43—19 |
| 3,015,182 | 1/1962 | Tuttle et al. | 43—19 |

WARNER H. CAMP, *Primary Examiner.*